United States Patent
Santiago et al.

(10) Patent No.: US 12,217,666 B1
(45) Date of Patent: Feb. 4, 2025

(54) METHODS AND SYSTEMS FOR MANAGING LIGHTING ON A TRANSPORTATION VEHICLE

(71) Applicant: Panasonic Avionics Corporation, Irvine, CA (US)

(72) Inventors: Jeff Santiago, Mission Viejo, CA (US); Gerald Espeleta, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 0 days.

(21) Appl. No.: 18/228,375

(22) Filed: Jul. 31, 2023

(51) Int. Cl.
 G09G 3/3208 (2016.01)
 B64D 11/00 (2006.01)

(52) U.S. Cl.
 CPC ........... G09G 3/3208 (2013.01); B64D 11/00 (2013.01); *B64D 2011/0038* (2013.01); *G09G 2320/043* (2013.01); *G09G 2320/0626* (2013.01); *G09G 2320/0686* (2013.01); *G09G 2360/144* (2013.01)

(58) Field of Classification Search
 CPC ........... G09G 3/3208; G09G 2320/043; G09G 2320/0626; G09G 2320/0686; G09G 2360/144; B64D 11/00; B64D 2011/0038
 USPC ........................................................ 345/207
 See application file for complete search history.

(56) References Cited

U.S. PATENT DOCUMENTS

| | | | | |
|---|---|---|---|---|
| 7,351,947 | B2* | 4/2008 | Dailey .................. | H05B 47/11 250/214 R |
| 10,321,549 | B2* | 6/2019 | Schuch ................ | G02F 1/1336 |
| 11,475,830 | B1* | 10/2022 | Cheng ..................... | G09G 3/32 |
| 11,922,901 | B1* | 3/2024 | Fawcett .................. | G09G 5/10 |
| 2012/0019152 | A1* | 1/2012 | Barnhoefer ........... | H05B 45/12 315/158 |
| 2012/0327051 | A1* | 12/2012 | Davies .................... | G09G 5/10 345/207 |
| 2013/0207947 | A9* | 8/2013 | Davies .................... | G06F 3/017 345/207 |
| 2016/0203791 | A1* | 7/2016 | Bell ........................ | G09G 5/10 345/207 |
| 2017/0221450 | A1* | 8/2017 | Kim ...................... | G06F 1/1637 |
| 2018/0281673 | A1* | 10/2018 | Garing .................... | B60Q 3/47 |

(Continued)

OTHER PUBLICATIONS

Finio; "Science with a Smartphone: Measure Light with Lux"; Scientific American; Oct. 3, 2019; https://www.scientificamerican.com/article/science-with-a-smartphone-measure-light-with-lux/; Printed on Jul. 18, 2023.

(Continued)

*Primary Examiner* — Tom V Sheng

(57) ABSTRACT

Methods and systems are provided for a transportation vehicle. One method includes determining ambient light baseline for the flight by measuring a first light intensity by a plurality of light sensors located within a plurality of physical zones of an aircraft cabin, before a flight and transforming the measured first light intensity based on sensor locations within each physical zone of the aircraft cabin; adjusting brightness level of seat display device at passenger seats located in the aircraft cabin based on the ambient light baseline; continuing to measure in-flight light intensity by the plurality of sensors; and automatically adjusting the brightness level of one or more seat display devices in response to the in-flight light intensity varying from the ambient light baseline by a first threshold value.

20 Claims, 13 Drawing Sheets

(56) References Cited

U.S. PATENT DOCUMENTS

| | | | | |
|---|---|---|---|---|
| 2018/0350320 A1* | 12/2018 | Ghosh | .................... | G09G 5/003 |
| 2020/0105225 A1* | 4/2020 | Greenebaum | ........ | G09G 3/2003 |
| 2020/0160813 A1* | 5/2020 | Aurongzeb | .............. | G09G 3/36 |
| 2022/0044653 A1* | 2/2022 | Peana | .................. | G09G 3/3225 |
| 2022/0351704 A1* | 11/2022 | Yung | ........................ | G09G 5/10 |
| 2023/0162695 A1* | 5/2023 | Chau | ....................... | G02F 1/172 |
| | | | | 345/207 |
| 2023/0237455 A1* | 7/2023 | Sain | ....................... | G06Q 30/06 |
| | | | | 705/39 |
| 2023/0317020 A1* | 10/2023 | Imai | .................... | G09G 3/3406 |
| | | | | 345/207 |

OTHER PUBLICATIONS

Hakimi; "Lumens Calculator: How to Determine Total Required Lumens for Your Space"; Insights by Alcon Lighting; Sep. 23, 2022; https://www.alconlighting.com/blog/residential-led-lighting/how-do-i-determine-how-many-led-lumens-i-need-for-a-space/#:~: text=Multiply%20the%20room%20square%20footage,candles%2C%20will%20require%204%2C000%20lumens; Printed on Jul. 18, 2023.

* cited by examiner

| Installation Location 379A | Daytime Luminance 379B | Nighttime Luminance 379C | Weighting Factors 368D |
|---|---|---|---|
| Bulkhead Area | 40-3500 lux | 0-40 lux | Cabin Lighting<br>Seat Device<br>Reading Lights<br>Windows open/close<br>Time of day<br>Monitors on/off |
| Head/Seatback area | 40-3500 lux | 0-40 lux | |
| Foot-well in use area (left aisle) | 25-1500 lux | 0-30 lux | |
| Footwell in use area (right aisle) | 25-1500 lux | 0-30 lux | |

METHODS AND SYSTEMS FOR MANAGING LIGHTING ON A TRANSPORTATION VEHICLE

TECHNICAL FIELD

The present disclosure relates to transportation vehicles in general, and more particularly, to technology for managing lighting on a transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

IFE systems today may use OLED (organic light emitting diode) based monitors or display devices. The monitors typically include an ambient light sensor with photodetection circuitry to detect aircraft cabin lighting by measuring the amount of ambient light present around the light sensor. The light sensor on the IFE monitor at the back of a passenger seat fails to accurately measure cabin lighting because of its mounting position/location. Because the light sensor measurement can be inaccurate, the use of the light sensor information results in inaccurate adjustment of IFE monitor brightness levels, which interferes with overall passenger experience during a flight. Continuous efforts are being made to develop technology to improve passenger experience by better lighting management on aircraft and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 3D shows an example of using the lighting data structure, according to one aspect of the present disclosure;

DETAILED DESCRIPTION

Figure 1A:
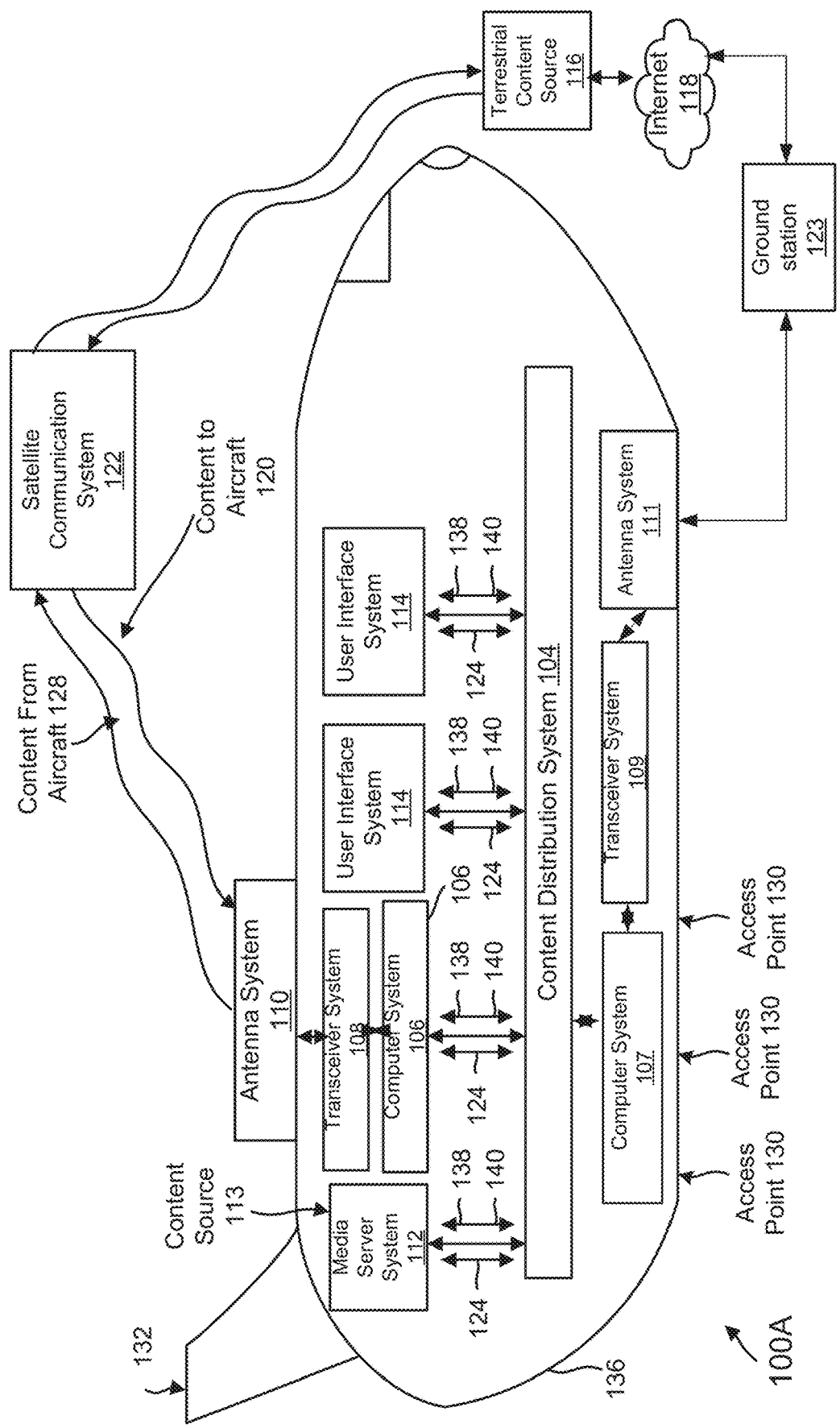
FIG. 1A shows an example of an operating environment for implementing the various aspects of the present disclosure on an aircraft.

In one aspect, innovative technology is disclosed for integrating light sensors located at different locations of a transportation vehicle with an entertainment system on the transportation vehicles, including aircraft, ships, trains, busses, and other vehicle types. The examples illustrating innovative technology are based on aircraft but can be implemented on other vehicle types.

In one aspect, innovative technology is disclosed to establish a network of ambient light sensors (may also be referred to as "light sensors" or "light sensor peripheral modules") throughout an aircraft cabin and integrate the light sensor network with an aircraft's Inflight Entertainment System's (IFE's). Each light sensor peripheral module is connected to a seat device monitor, a seat box, a server system (may also be referred to as a "headend server") or another device. The connection may be based on a serial bus interface, RS232/485 bus or any other interconnect type.

In one aspect, the network of light sensors is used to adjust lighting within an aircraft cabin. The light sensors are placed strategically within different sections/zones of an aircraft cabin, e.g., first class, business class, premium economy, and economy class, crew area, gallery area, and hallway including passageway abutting/across seat rows, overhead bin and other areas). The light sensors are placed within an average line of sight of passenger seats of a zone. For premium economy and economy class cabins, the light sensors may be installed in a bulkhead area and/or the seat group areas where a physical, In-Use Light (IUL) (or cabin light) is located. For first and business class Cabin, individual light sensors may be installed for each seat. In one aspect, a greater number of light sensors in each cabin location will provide more accurate data. The light sensors are installed at optimal locations either close to an IFE display monitor or in the seat frame facing the aisle way.

Each physical zone may be assigned an average luminance level (e.g., a lux level, where 1 lux is equal to illumination of 1 metre square surface that is one metre away from a single candle). The illumination is determined by a weightage scheme applied to sensor measurements within a target (or threshold level) according to a prioritized measurement arrangement. The prioritized measurement arrangement includes relative distance/viewing angle of each sensor from a light source within the zone, a measured light blockage coefficient as compared with initial cabin measurements without passengers, aircraft bulkhead/curtain position (open/closed/partially closed), window shade position (light source open/closed/partially closed), and/or overhead lighting including localized passenger-controlled lighting (light source on, partially on, off).

In one aspect, the brightness level of one or more IFE seat device/personal electronic device (PED) securely pained to the seat device is automatically adjusted based on a light intensity level predicted/current cabin activity level (e.g., during early morning, dim for better sleeping, during midday, increase intensity to keep passengers awake, during evening/night, lower intensity level so as to ease passengers anxiety/wind down get ready for slumber/lower level activities).

In one aspect, the light sensors are calibrated based on light sensor manufacturer guidelines and threshold levels. Before a flight is boarded, the luminance (or lux) levels of all light sensors are measured to determine an ambience light baseline for a flight. For data integrity, the maximum and minimum measurement readings may be ignored. Using a weighting scheme, an average of the light sensor data is determined. The weighting is based on the installation location of all sensors (e.g., a 15% weight is applied to sensor data collected from light sensors installed near foot areas (one for each side of aisle), a 35% weight is applied to sensor data collected from sensors installed in bulkhead/wall location, and a 35% weight is applied to sensor data collected from sensors installed near seatback head area. Of course, these percentages are simply shown as examples and are not intended to limit the adaptive aspects of the present disclosure. The ambient light baseline before the flight is boarded is saved in a storage device.

Once the flight is boarded, the light sensor data is collected again and processed similar to the data processed before the flight is boarded. The pre-boarded data is used as ambient light baseline level if the difference between the pre-boarded and after boarded data is below a threshold level. The light sensor data is then monitored throughout the flight and compared to the ambient light baseline level to automatically adjust seat device monitor brightness levels. It is noteworthy that the various examples described below illustrate adjusting the seat device monitor brightness levels, however, the innovative technology can be used to adjust brightness levels of PEDs and other devices that are securely connected ("paired") with the IFE system on the aircraft.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

Figure 3A:
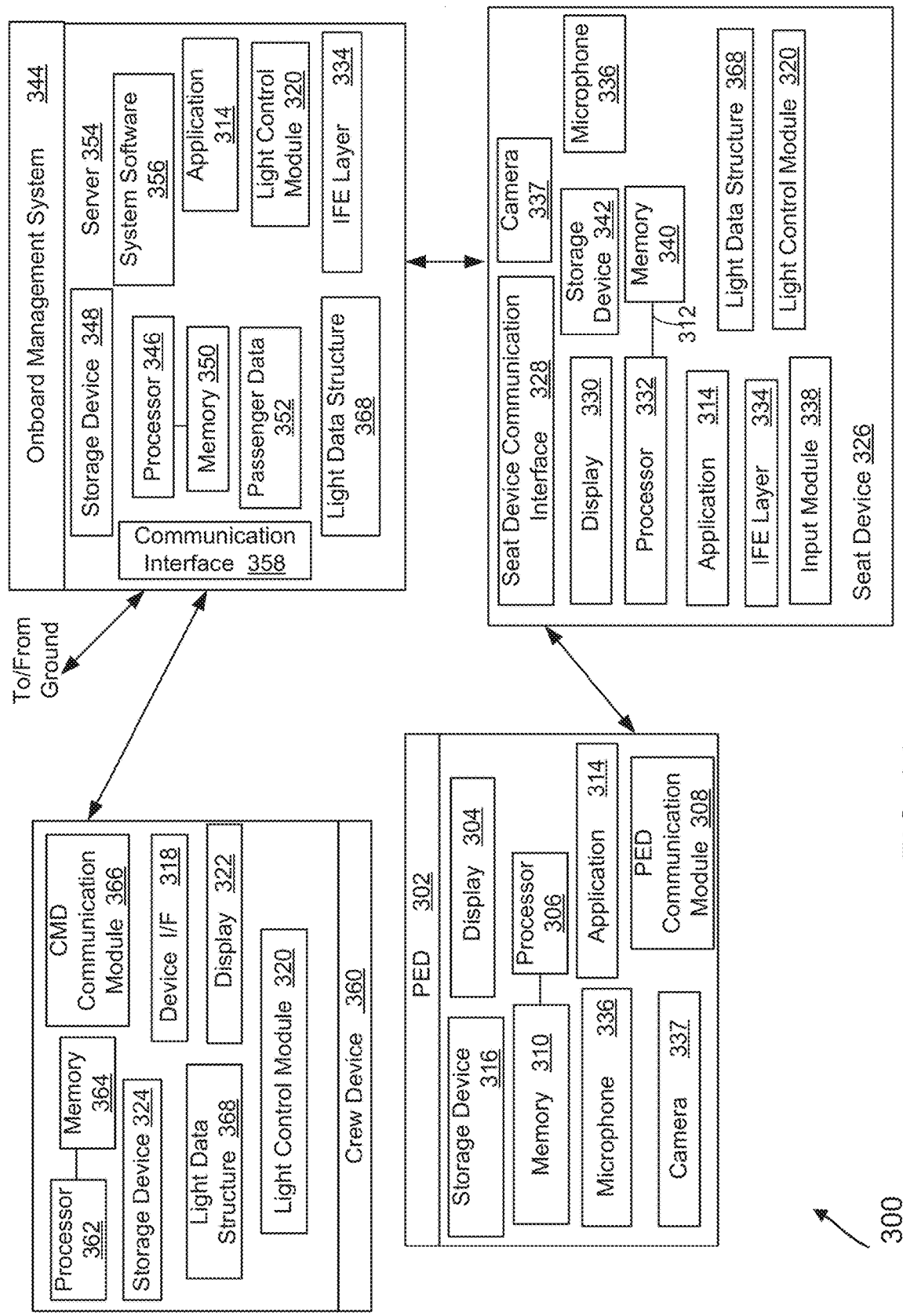
FIG. 3A shows an example of a system for using light measured by a plurality of light sensors on an aircraft, according to one aspect of the present disclosure.

System 100A may include one or more content source 113 and one or more user (or passenger) interface systems (may also be referred to as a seat device/seatback device/IFE device 326 described below with respect to FIG. 3A) 114 that communicate with a real-time content distribution system 104.

As an example, the content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein is not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, terrestrial content source 116 can be configured to communicate with other terrestrial content sources (not shown). Terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The brightness of the display device is adjusted using the innovative technology of the present disclosure, as described below in detail.

The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via a wireless access point 130. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
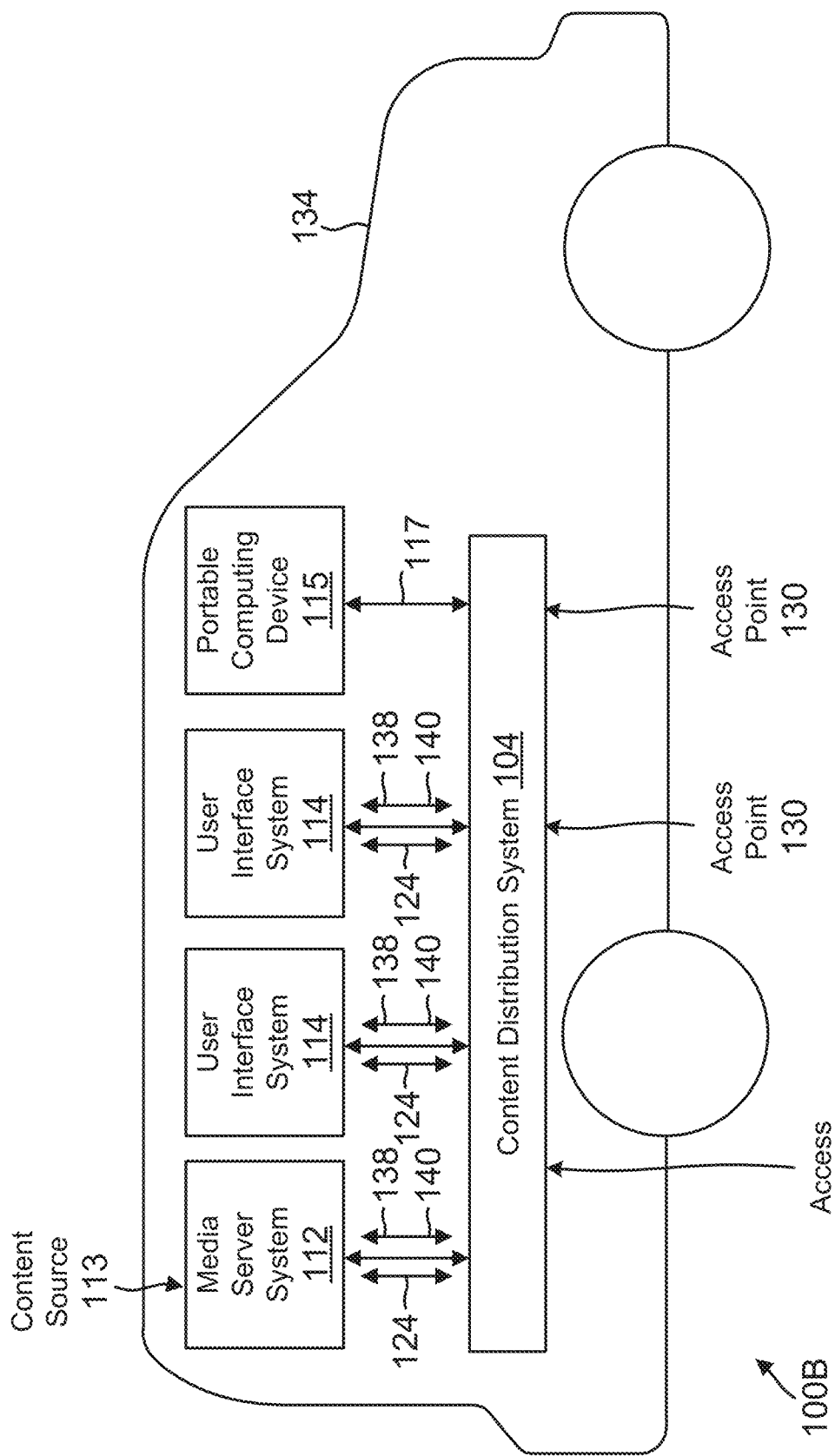
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
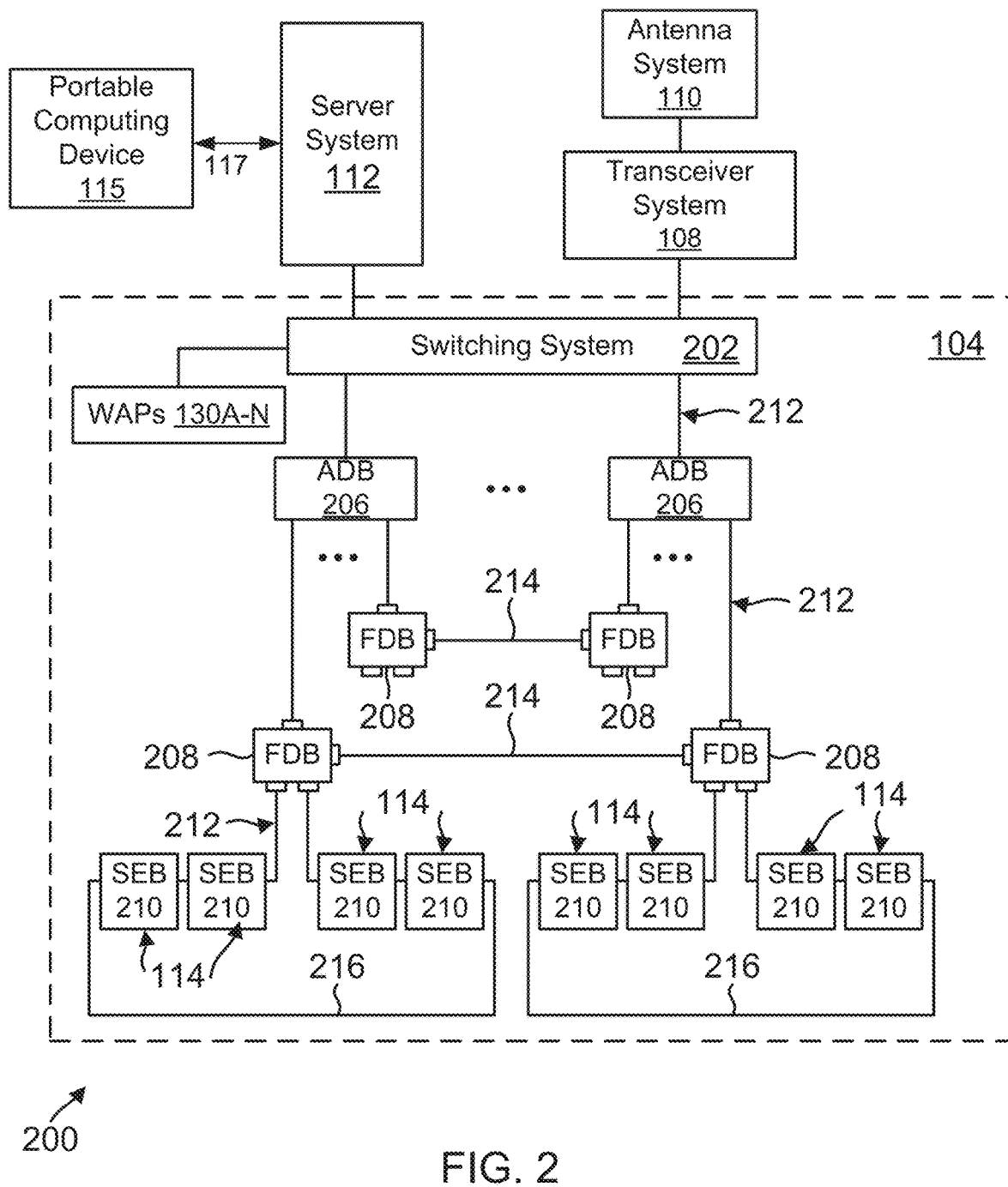
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

Distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

System 300: FIG. 3A shows an example of a system 300 configured to operate within an aircraft system (e.g., an onboard management system 344 executing an IFE layer, may also be referred to as the IFE system), according to one aspect of the present disclosure.

In one aspect, system 300 includes an onboard management system 344, a seat device 326, a PED 302, when authorized, and a crew device (may be referred to as "CMD") 360, when authorized. In yet another aspect, system 300 includes the CMD 360 and the PED 302 or the CMD 360 and the seat device 326, respectively.

In one aspect, the onboard management system 344 includes a server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, a lighting data structure 368 (may also be referred to as data structure 368), a light control module 320 (may also be referred to as module 320), applications and program files, including system software 356, application 314, and others. It is noteworthy that module 320 may also be executed at the seat device 326, CMD 360 or any other computing device. Details regarding data structure 368 and module 320 are provided below.

In one aspect, system software 356 is executed by processor 346 to control the overall operation of server 354. Application 314 may be downloaded from server 354 by passengers using an authorized PED 302 paired with the seat device 326 and/or server 354 for accessing digital content.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options for users. The IFE layer 334 provides audio/video content as well as controls for accessing the content.

In one aspect, processor 332 executes instructions for the light control module 320 using the light data structure 368 to adjust display 330 brightness level, based on light sensor data from light sensors located throughout the aircraft cabin, as described below in detail. In another aspect, server 354 provides the light related information to the seat device 326 to adjust the brightness level of the display 330, as described below in detail.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 may also execute the application 314 that may be used by the passenger to view media content or various computing functions that are enabled by the seat device 326. Application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving voice input. CMD 360 may also include a camera (not shown) for taking pictures or making a video. The CMD 360 may also include a storage device 324 that may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In yet another aspect, CMD 360 stores the light control module 320 and a portion or the entirety of lighting data structure 368 to send instructions to seat device 326 to adjust brightness levels based on data collected from a group of light sensors, as described below in detail.

In one aspect, the PED 302 is securely paired with the seat device 326. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving voice input from a passenger. The voice input can be converted into text by application 314 for processing. In another aspect, PED 302 also includes a camera 337 that may be used by a passenger to upload a video.

The PED 302 includes a storage device 316 that may be or may include any storage medium for storing data in a non-volatile manner, such as one or more magnetic or optical based disks, flash memory, or solid-state drive. The storage device 316 may be used to store content displayed on display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third-party trademark rights). In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Figure 3B:
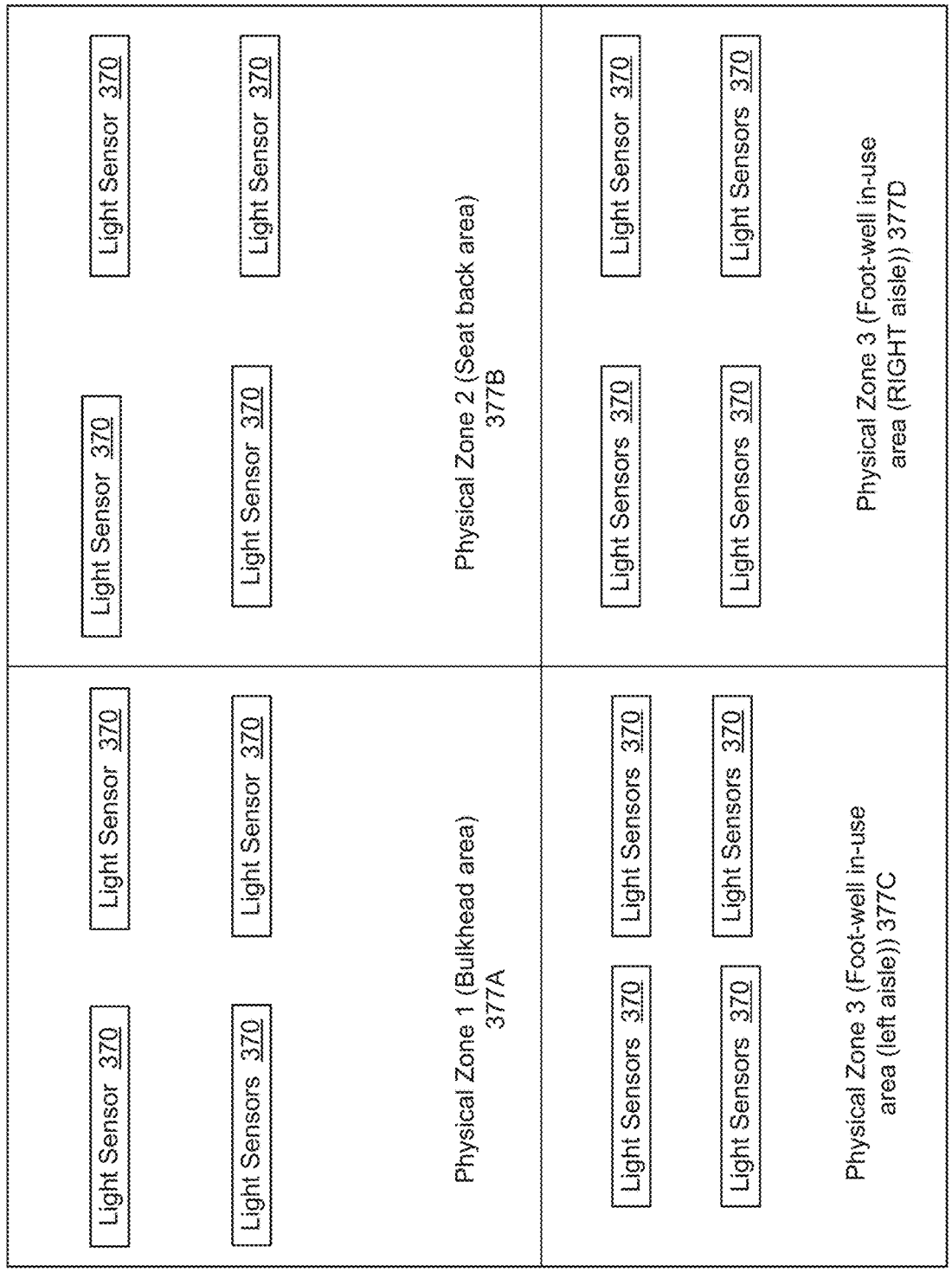
FIG. 3B shows an example of locating light sensors within different physical zones of an aircraft cabin, according to one aspect of the present disclosure.
Figure 3C:
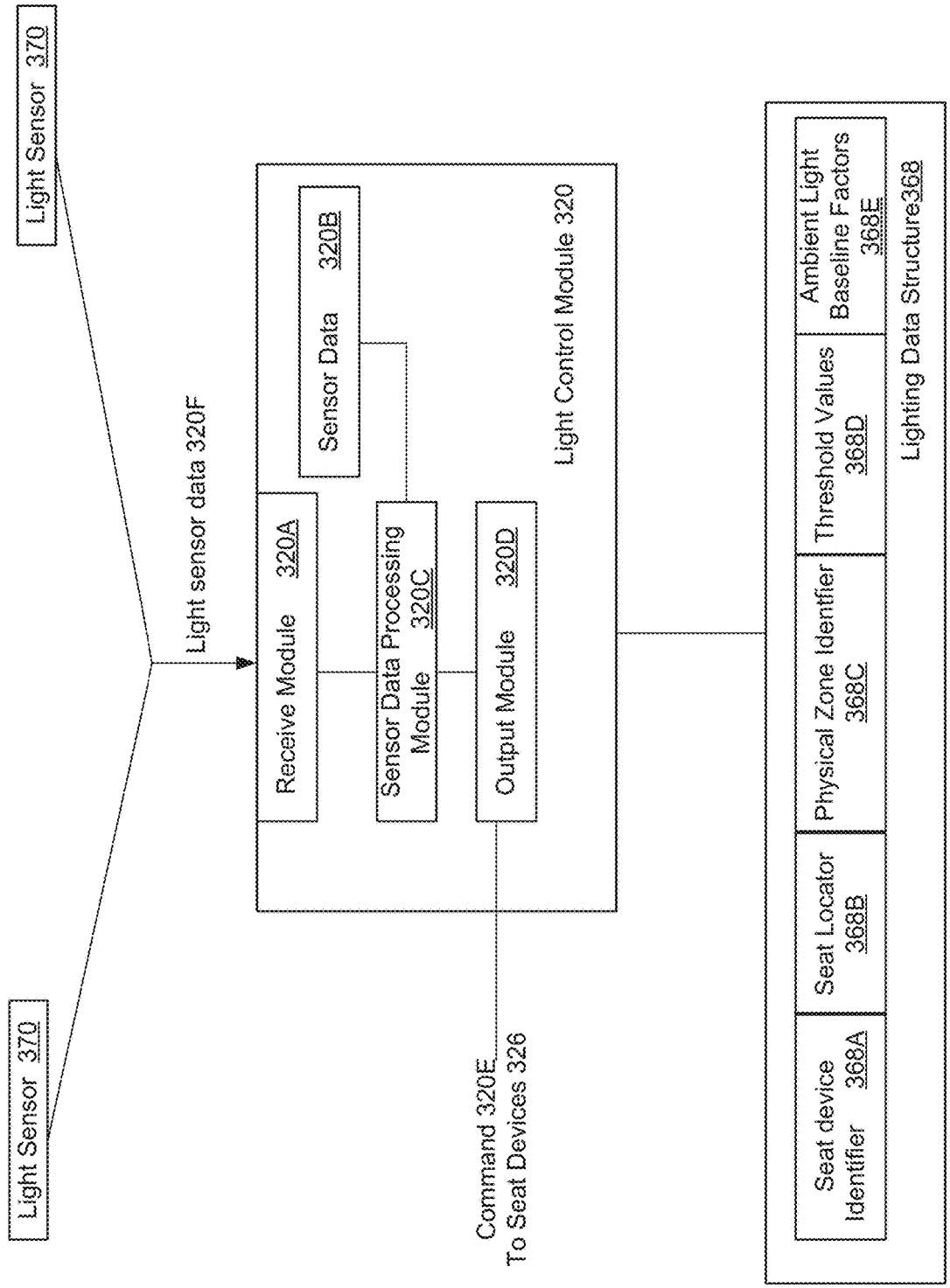
FIG. 3C shows an example of a light control module and a lighting data structure, according to one aspect of the present disclosure.
Figure 3E:
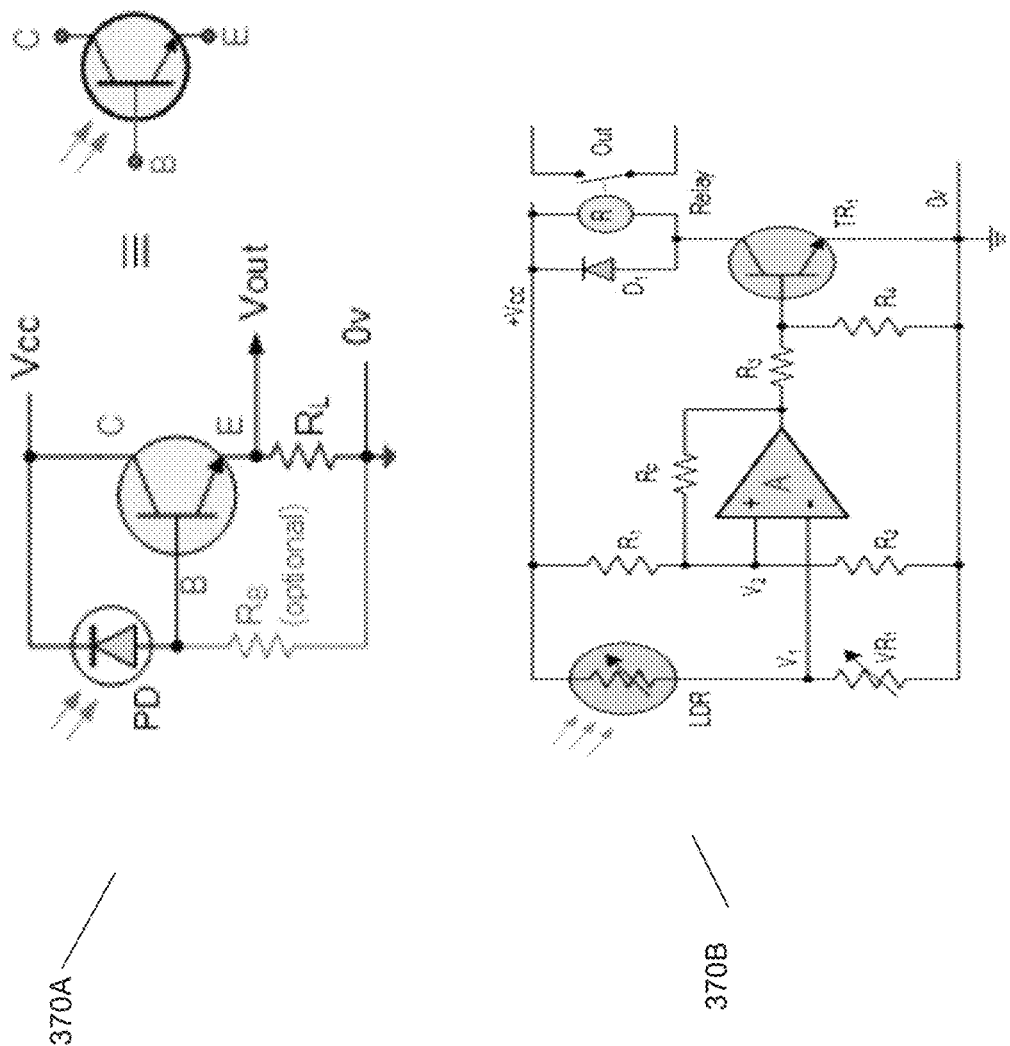
FIG. 3E shows an example of light sensor circuitry used by the system of FIG. 3B, according to one aspect of the present disclosure.

Aircraft Cabin Sections/Physical Zones: FIG. 3B shows a block diagram of different aircraft zones 377 where light sensors 370 are strategically placed to collect light data. Light sensors 370 are photoelectric devices that convert light energy (photons) whether visible or infra-red light into an electrical signal. A light sensor generates an output signal indicating light intensity. The light sensor is typically a passive device that converts light energy into an electrical signal output. Light sensors are commonly known as "Photoelectric Devices" or "Photo Sensors." Examples of circuitry for light sensors 370 are shown in FIG. 3E and described below in detail.

In one aspect, the various zones may be located at different sections of an aircraft cabin, including first class, business class, economy class, premium economy, crew area and other areas. For example, physical zone 377A may be in a bulkhead area of an aircraft cabin with multiple light sensors 370. Another physical zone is 377B that is passenger seat back area (the area behind a passenger seat). A third physical zone 377C and a fourth physical zone 377D is the foot-well area on both the left side and right side of the aisle.

Light Control Module 320 (or module 320): FIG. 3C shows an example of module 320, according to one aspect of the present disclosure. Module 320 includes a receive module 320A that periodically receives light sensor data 320F from a plurality of light sensors 370 located throughout the aircraft cabin and configured to operate as a network of light sensors. The light sensor data 320F may include the luminous flux measured in lumens and luminous intensity measured in candelas. Module 320 includes a sensor data processing module 320C (also referred to as module 320C) that maintains a running, weighted average of light sensor data, shown as sensor data 320B. Module 320C determines ambient light baseline for the aircraft cabin and compares the average against a previous duration (e.g., without limitation, 1 minute earlier). If value has increased beyond or equal to a first threshold level, then an increase is noted. If value has decreased, compared to a second threshold level, then a decrease is noted. The increased or decreased value is used to adjust brightness of the seat device 326 display 330 and/or the brightness of PED display 304. The decrease indicates a low light ambience mode, while the increase indicates a high light ambience mode. Based on the ambient light condition, the light control module 320 determines a "Bright/daytime," "Dark/nighttime" or another light condition. Based on the light condition a command 320E is generated by an output module 320D that is sent to each seat device/PED within one or more aircraft cabin sections to adjust their brightness level.

FIG. 3C also shows an example of data structure 368 that includes an identifier 368A for each passenger seat, a seat locator 368B that identifies the location of each seat, a physical zone identifier 368C indicating a physical location of each light sensor, and threshold values 368D that are used to detect change in ambient lighting of an aircraft cabin for adjusting brightness of seat device and/or PEDs. Data structure 368 may also include various factors 368E that are used to adjust the light sensor data to determine ambient light baseline and detect change in lighting conditions. The factors may include cabin ambient lighting, individual seat reading lights, time of day, windows open/close/partially open, monitors on/off or any other parameters.

FIG. 3D also shows an example of using the various data structure threshold values in block 379. The installation location for each sensor is shown in column 379A. Column 379B shows the daytime luminance range for each location, while column 379C shows a night-time luminance range for each location. The weighing factors are shown in column 368D. It is noteworthy that the various values of FIG. 3D are intended to be used as examples and do not limit the scope of the various adaptive aspects of the present disclosure.

In one aspect, the light control module 320 uses machine learning to accurately determine ambient light baseline over time and adjust the weightage for light sensor data based on the location of each light sensor. The light control module 320 continues to collect sensor data 320B over different flights and may provide that data to ground system computing devices. Based on the machine learned data, the threshold levels for different physical zones may be updated for an accurate ambient light baseline determination.

Light Sensor(s) 370: FIG. 3E shows an example of different circuitry for light sensors 370A and 370B. Light sensor 370A is a photo-junction device referred to as a phototransistor, which is a photodiode with amplification. The phototransistor light sensor has a reversed biased, collector-base PN-junction exposed to a radiant light source. Phototransistors operate like a photodiode and provide current gain Phototransistors consist mainly of a bipolar NPN transistor and use photons to generate a base current which in turn causes a collector to emit current.

Light sensor 370B uses a light dependent resistor (LDR) that changes its electrical resistance when light falls upon it. In light sensor 370B, the LDR and a potentiometer VR1 form an adjustable arm of a simple resistance bridge network, with two fixed resistors R1 and R2. Both sides of the bridge form potential divider networks across the supply voltage whose outputs V1 and V2 are connected to non-inverting and inverting voltage inputs, respectively, of an operational amplifier. The operational amplifier is configured as a differential amplifier also known as a voltage comparator with feedback whose output voltage condition is determined by the difference between input signals or voltages, V1 and V2. The resistor combination R1 and R2 form a fixed voltage reference at input V2, set by a ratio of the two resistors. The LDR-VR1 combination provides a variable voltage input V1 proportional to the light level being detected by the photoresistor.

The output from the operational amplifier is used to control a relay, which is protected by a free wheel diode, D1 When the light level sensed by the LDR and its output voltage falls below the reference voltage set at V2, the output from the operational amplifier changes state activating the relay and switching the connected load. Similarly, as the light level increases the output will switch back turning "OFF" the relay The operation of light sensor circuit 370B can be reversed to switch the relay "ON" when the light level exceeds the reference voltage level and vice versa by reversing the positions of the light sensor LDR and the potentiometer VR1. The potentiometer can be used to "preset" a switching point of the differential amplifier to any light level.

It is noteworthy that 370A and 370B are only examples of light sensor 370 and are not intended to limit the various adaptive aspects of the present disclosure to any specific light sensor circuitry.

Figure 4A:
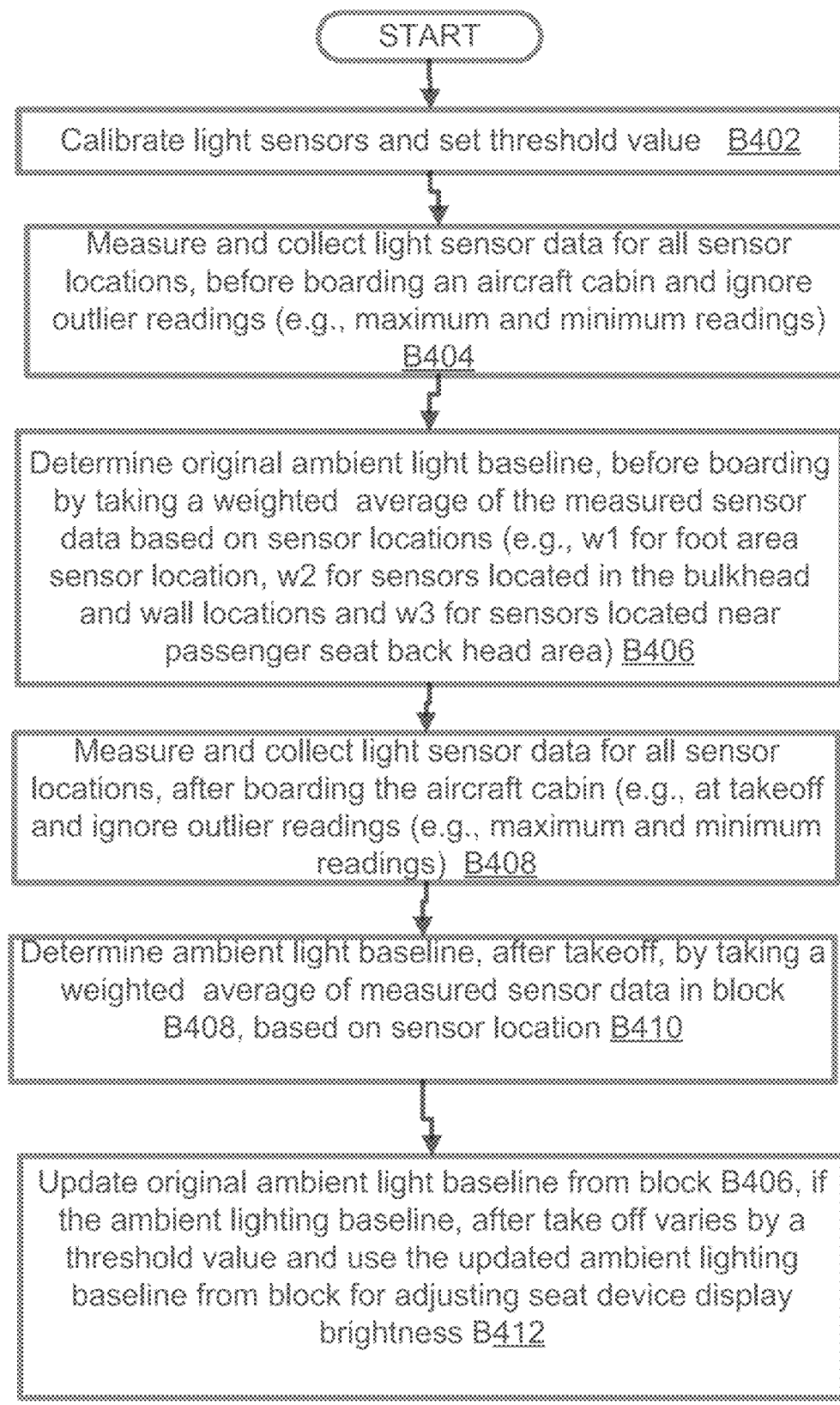
FIG. 4A shows a process flow diagram for using a plurality of light sensors located in an aircraft cabin, according to one aspect of the present disclosure.

Process Flows: FIG. 4A shows a process 400, according to one aspect of the present disclosure. Process 400 is executed by light control module 320 using data structure 368. As mentioned above module 320 may be executed in server 354, seat device 326 and/or CMD 360.

In one aspect, in block B402, light sensors 370 are first calibrated before a flight, based on light sensor manufacturer guidelines. The threshold values for the light sensors (e.g., 368D, FIG. 3C and columns 379B and 379C of FIG. 3D) are set. In block B404, before a flight is boarded, the luminance levels of all light sensors are measured. For data integrity, the maximum and minimum measured readings may be ignored.

In block B406, ambient light baseline is determined using a weighted (e.g., by applying different weight W1, W2, W3 and others) average for the measured and collected light sensor data. The weighting is based on the installation location of all sensors (e.g., a 15% (w1) weight is given to data collected from light sensors installed near foot areas (one for each side of aisle), a 35% (w2) weight is applied to data collected for light sensors installed in bulkhead/wall location, and a 35% (w3) weight is applied to data collected for light sensors installed near seatback head area. Of course, these percentages are simply shown as examples and are not intended to limit the adaptive aspects of the present disclosure. The ambient light baseline value (e.g., 302B, FIG. 3B) before the flight is boarded is saved in a storage device.

Once the flight is boarded, in block B408, the light sensor data is collected and processed similar to the data processed before the flight is boarded (B406). In block B410, the ambient light baseline is determined again, like block B406.

In block B412, the preboarded ambient light baseline value from block B406 is compared with the ambient light baseline determined in block B410. If the difference between the two values has reached a threshold value, then the pre-boarded ambient light baseline value is updated and the updated value is used as the ambient light baseline for the flight. In another instance, the pre-boarded ambient light baseline from block B406 is used as the ambient light baseline level if the difference between the pre-boarding and after boarding is below a threshold level. The light sensor data is monitored throughout the flight and compared to the ambient light baseline level to automatically adjust seat device monitor brightness levels as described below with respect to FIG. 4B.

Figure 4B:
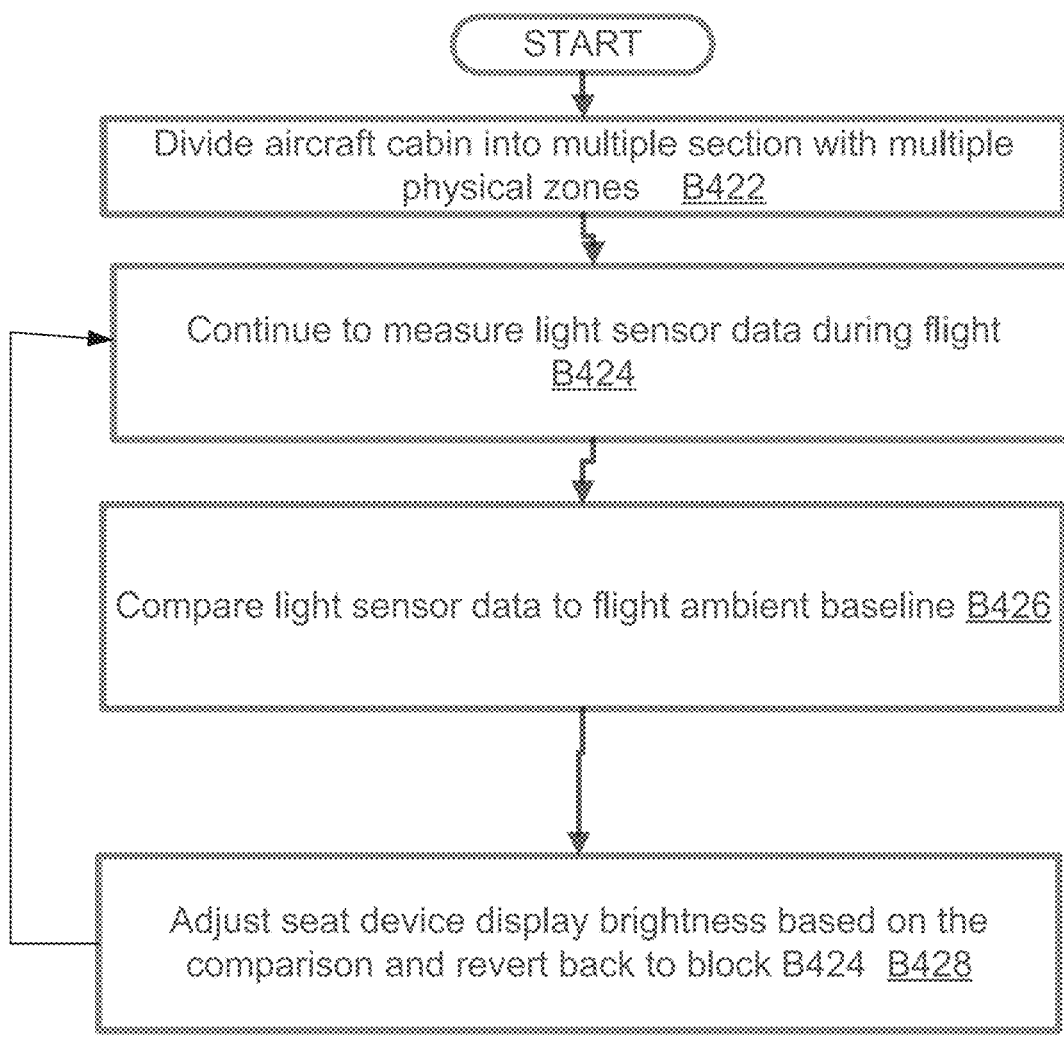
FIG. 4B shows another process flow diagram for using a plurality of light sensors located in an aircraft cabin, according to one aspect of the present disclosure.

FIG. 4B shows a process 420 for monitoring ambient light in an aircraft cabin using a network of light sensors placed throughout an aircraft cabin, instead of light sensors installed in seat device monitors, according to one aspect of the present disclosure. Process 420 begins after process 400 of FIG. 4A has been executed to establish an ambient light baseline for an aircraft cabin. The ambient light baseline value may be stored as sensor data 302B (FIG. 3C). As described above, the aircraft is divided into multiple sections with one or more physical zones (e.g., 377A-377D, FIG. 3B). The light sensors located at different physical zones measure light in block B424. The measured data is processed like block B406 of FIG. 4A. In block B426, the in-flight measured/processed light sensor data is compared with the ambient light baseline that is set in block B412 of FIG. 4A. If the comparison indicates that the in-flight measured/processed data is different from the ambient baseline by a threshold value, then in block B428, a command is generated to automatically adjust the brightness of seat devices and/or paired PEDs. It is noteworthy that the luminance level for different seats may vary based on the seat locations and therefore, the brightness level is adjusted based on a seat-by-seat basis.

Figure 4C:
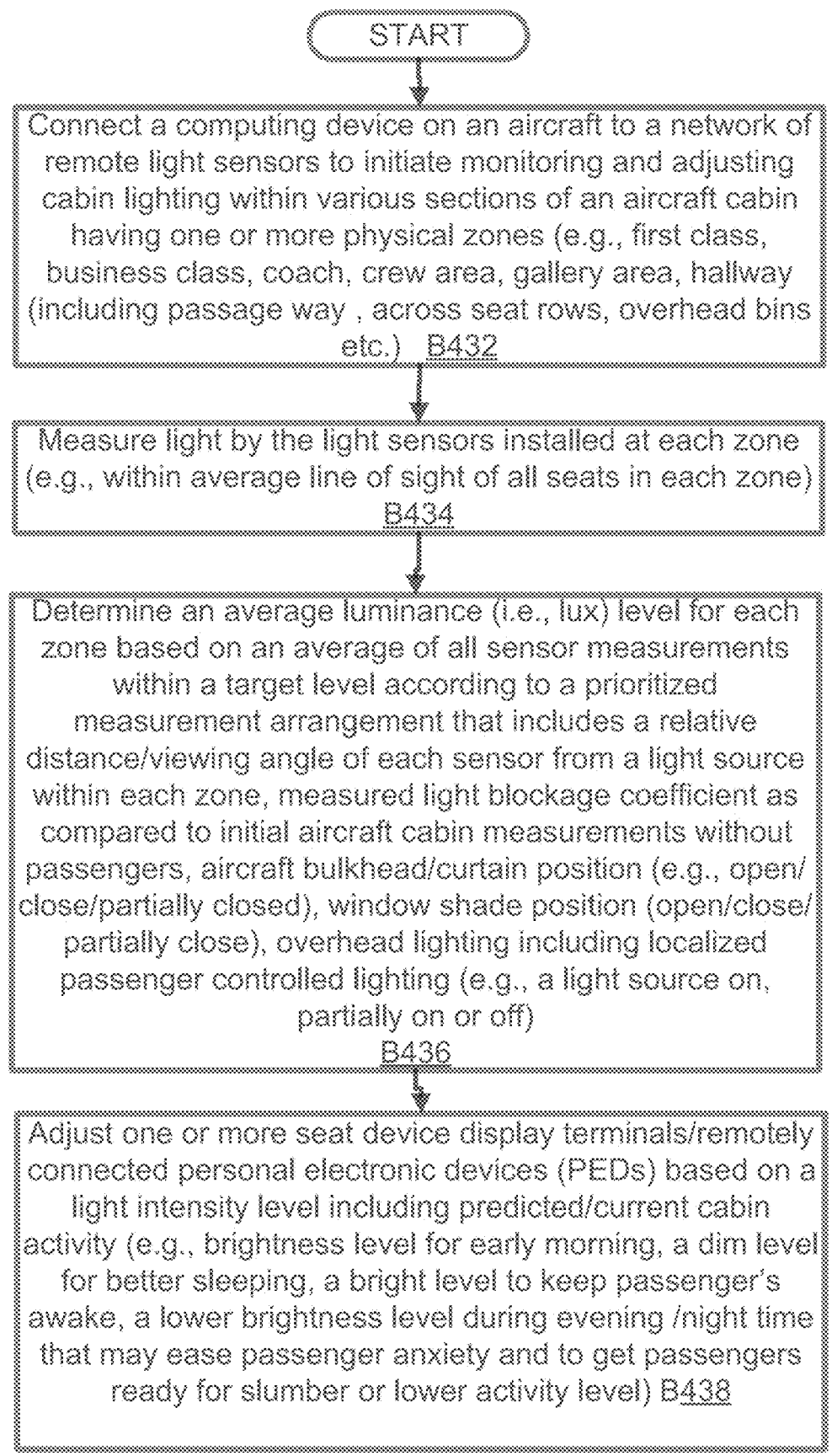
FIG. 4C shows yet another process flow diagram for using a plurality of light sensors located in an aircraft cabin, according to one aspect of the present disclosure.

FIG. 4C shows yet another process 430 that is based on using a network of ambient light sensors throughout an aircraft cabin and integrated with an aircraft's IFE system.

As mentioned above, each light sensor operates as a peripheral module. In block B432, each light sensor is connected to a seat device 326 (FIG. 3A), a seat box 210 (FIG. 2), a server system (may also be referred to as a "headend server") 354 (FIG. 3A) or another device. The connection may be based on a serial bus interface, RS232/485 bus or any other interconnect type.

The light sensors are placed strategically within different sections/zones of an aircraft cabin, e.g., first class, business class, premium economy, and economy class, crew area, gallery area, and hallway including passageway abutting/across seat rows, overhead bin and other areas). The light sensors are placed within an average line of sight of passenger seats of a zone. For premium economy and economy class cabin light sensors may be installed in the bulkhead areas and/or the seat group areas where a physical, In-Use Light (IUL) (or cabin light) is located. For first and business class cabins, individual light sensors may be installed for each seat. In one aspect, a greater number of light sensors in each cabin zone will provide more accurate data. The light sensors are installed at optimal locations either close to an IFE display monitor or in the seat frame facing the aisle way.

Each zone may be assigned an average luminance level (e.g., a lux level, where 1 lux is equal to illumination of 1 metre square surface that is one metre away from a single candle). In block B434, light is measured by light sensors. In block B436, the illumination (or average luminance) is determined by a weighting scheme that is applied to the light sensor measurements within a target (or threshold level) according to a prioritized measurement arrangement. The prioritized measurement arrangement includes relative distance/viewing angle of each light sensor from a light source within the zone, a measured light blockage coefficient as compared with initial cabin measurements without passengers (e.g., as shown in FIG. 4A), aircraft bulkhead/curtain position (open/closed/partially closed), window shade position (light source open/closed/partially closed), and/or overhead lighting including localized passenger-controlled lighting (light source on, partially on, off).

In one aspect, in block B438, the brightness level of one or more IFE seat device/PED securely paired to the seat device is automatically adjusted based on the light intensity level predicted/current cabin activity level (e.g., during early morning, dim for better sleeping, during mid-day, increase intensity to keep passengers awake, during evening/night, lower intensity level so as to ease passengers anxiety/wind down get ready for slumber/lower level activities).

Figure 4D:
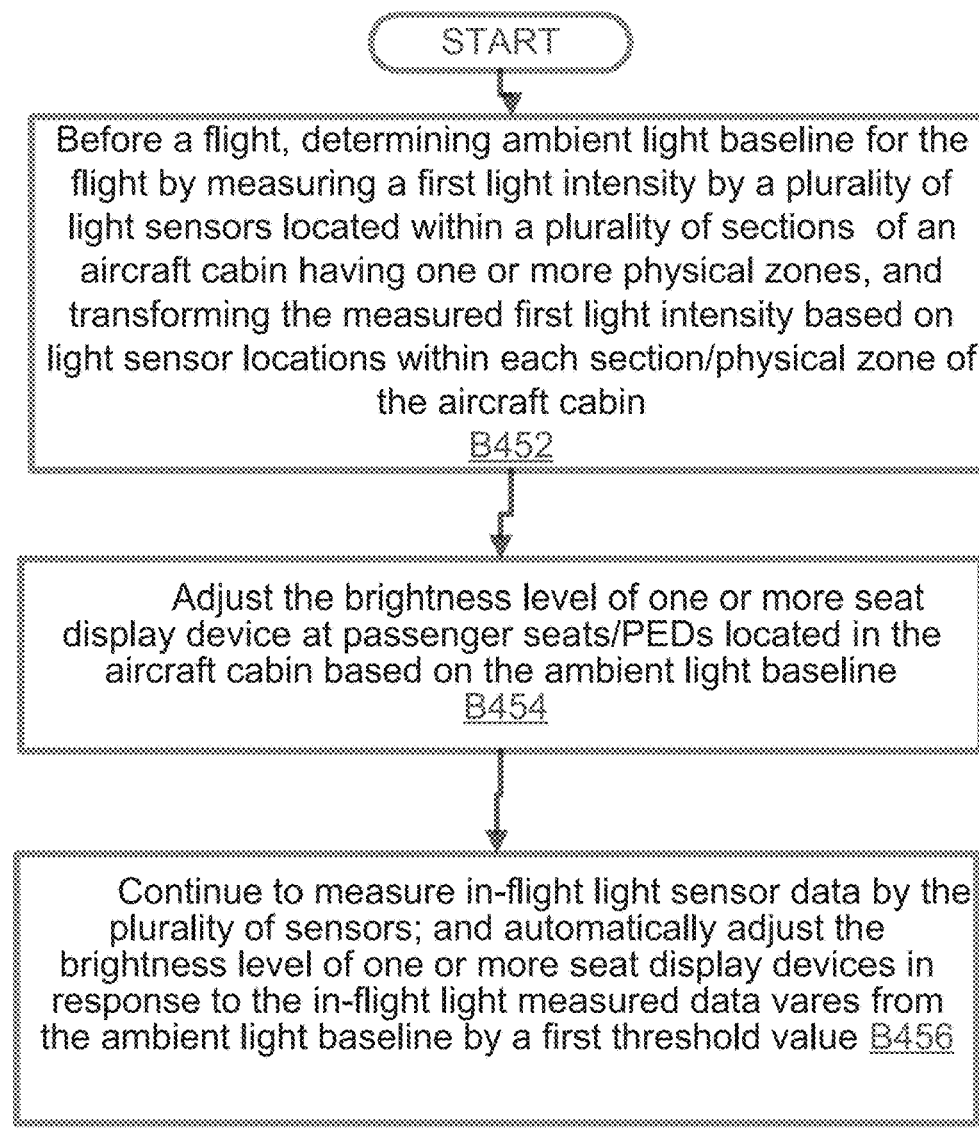
FIG. 4D shows another process flow for using a plurality of light sensors located in an aircraft cabin, according to one aspect of the present disclosure.

FIG. 4D shows yet another process 450, according to one aspect pf the present disclosure. Process 450 begins after the ambient light baseline for a flight has been determined, as described above with respect to FIG. 4A.

Before a flight takes off, in block B452, the light control module 320 determines the ambient light baseline for the flight by measuring a first light intensity by a plurality of light sensors located within a plurality of sections of an aircraft cabin having one or more physical zones. The measured/collected data is then transformed based on sensor locations within each physical zone of the aircraft cabin. This is described above in block B406 (FIG. 4A) and block B436 (FIG. 4C). Thereafter, in block B454, the brightness level of seat display device/PED at passenger seats located in the aircraft cabin is adjusted based on the ambient light baseline. In block B456, the light control module 320 continues to measure in-flight light intensity by the plurality of sensors; and automatically adjust the brightness level of one or more seat display devices in response to the in-flight light intensity varying from the ambient light baseline by a first threshold value.

The technology disclosed herein is efficient because it accurately measures ambient light, the aircraft is not dependent on the crew to manually manage cabin lighting, can be applied to any aircraft type, and improve the lifespan of OLED seat device display screen.

Figure 5:
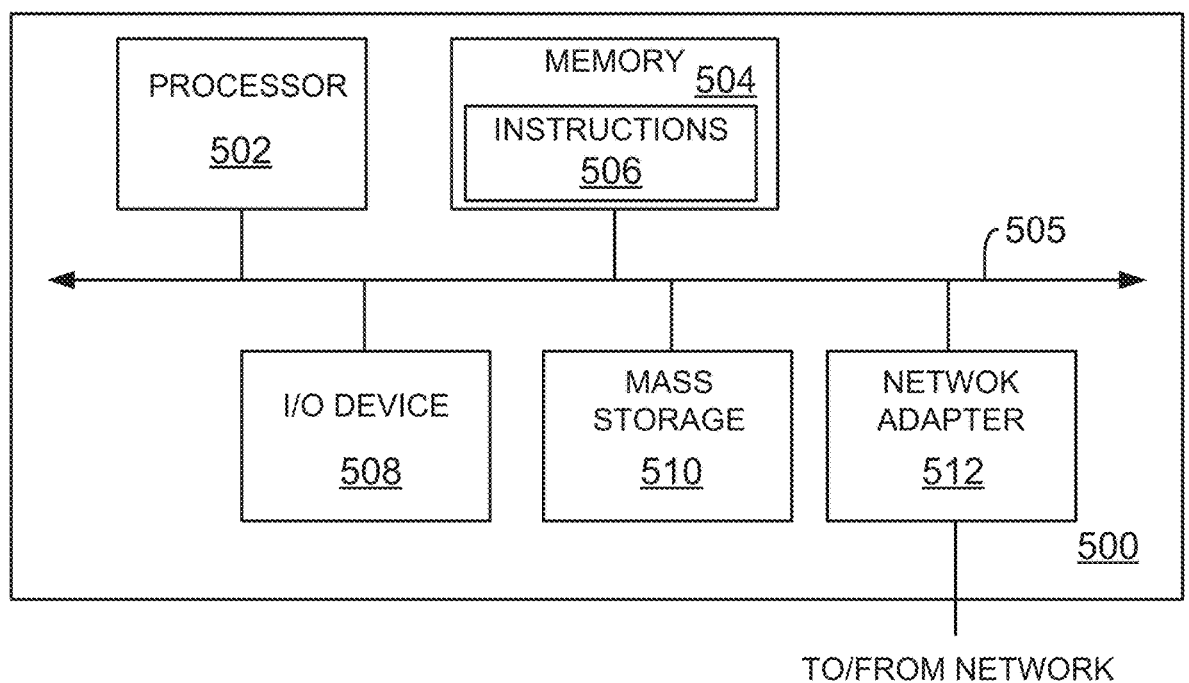
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIGS. 4A-4D executed by module 320 as well as the data structure 368/379, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and maybe, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing cabin lighting on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
   before a flight, determining ambient light baseline for the flight by measuring a first light intensity based on a plurality of first light sensor data measured respectively by a plurality of light sensors located within a plurality of physical zones of an aircraft cabin, and transforming the measured first light intensity into the ambient light baseline based on sensor locations within each physical zone of the aircraft cabin;
   adjusting brightness level of seat display device at passenger seats located in the aircraft cabin based on the ambient light baseline;
   continuing to measure in-flight light intensity by the plurality of sensors; and
   automatically adjusting the brightness level of one or more seat display devices in response to the in-flight light intensity varying from the ambient light baseline by a first threshold value.

2. The method of claim 1, wherein the first light intensity is measured before the flight is boarded.

3. The method of claim 2, further comprising
   measuring a second light intensity based on a plurality of second light sensor data measured respectively by the plurality of sensors, after the flight is boarded and before take-off, and updating the measured second light intensity based on the sensor locations.

4. The method of claim 3, further comprising:
   updating the ambient light baseline, in response to the updated second light intensity varying from the ambient light baseline by a second threshold value.

5. The method of claim 1, further comprising:
   for transforming the first light intensity, using a first weighting factor for a first set of light sensors located near a foot area of each seat, a second weighting factor for a set of light sensors installed at wall locations within the aircraft cabin, and a third weighting factor for a set of light sensors located at seat back head area of the passenger seats within the aircraft cabin.

6. The method of claim 5, wherein the first weighting factor is smaller than the second and the third weighting factor.

7. The method of claim 1, wherein the physical zones of the aircraft cabin are configured such that each passenger seat is assigned at least two light sensors.

8. A non-transitory machine-readable storage medium having stored thereon instructions for performing a method, comprising machine executable code which when executed by at least one machine, causes the machine to:
   before a flight, determine ambient light baseline for the flight by measuring a first light intensity based on a plurality of first light sensor data measured respectively by a plurality of light sensors located within a plurality of physical zones of an aircraft cabin, and transform the measured first light intensity into the ambient light baseline based on sensor locations within each physical zone of the aircraft cabin;
   adjust brightness level of seat display device at passenger seats located in the aircraft cabin based on the ambient light baseline;
   continue to measure in-flight light intensity by the plurality of sensors; and
   automatically adjust the brightness level of one or more seat display devices in response to the in-flight light intensity varying from the ambient light baseline by a first threshold value.

9. The non-transitory machine-readable storage medium of claim 8, wherein the first light intensity is measured before the flight is boarded.

10. The non-transitory machine-readable storage medium of claim 9, wherein a second light intensity is measured based on a plurality of second light sensor data measured respectively by the plurality of sensors, after the flight is boarded and before take-off, and the measured second light intensity is updated based on the sensor locations.

11. The non-transitory machine-readable storage medium of claim 10, wherein the ambient light baseline is updated, in response to the updated second light intensity varying from the ambient light baseline by a second threshold value.

12. The non-transitory machine-readable storage medium of claim 8, wherein for transforming the first light intensity, use a first weighting factor for a first set of light sensors located near a foot area of each seat, a second weighting factor for a set of light sensors installed at wall locations within the aircraft cabin, and a third weighting factor for a set of light sensors located at seat back head area of the passenger seats within the aircraft cabin.

13. The non-transitory machine-readable storage medium of claim 12, wherein the first weighting factor is smaller than the second and the third weighting factor.

14. The non-transitory machine-readable storage medium of claim 8, wherein the physical zones of the aircraft cabin are configured such that each passenger seat is assigned at least two light sensors.

15. A system, comprising:
   a memory containing machine readable medium comprising machine executable code having stored thereon instructions; and a processor coupled to the memory to execute the machine executable code to:
      before a flight, determine ambient light baseline for the flight by measuring a first light intensity based on a plurality of first light sensor data measured respectively by a plurality of light sensors located within a plurality of physical zones of an aircraft cabin, and transform the measured first light intensity into the ambient light baseline based on sensor locations within each physical zone of the aircraft cabin;
      adjust brightness level of seat display device at passenger seats located in the aircraft cabin based on the ambient light baseline;
      continue to measure in-flight light intensity by the plurality of sensors; and automatically adjust the brightness level of one or more seat display devices in response to the in-flight light intensity varying from the ambient light baseline by a first threshold value.

16. The system of claim 15, wherein the first light intensity is measured before the flight is boarded.

17. The system of claim 16, wherein a second light intensity is measured based on a plurality of second light sensor data measured respectively by the plurality of sensors, after the flight is boarded and before take-off, and the measured second light intensity is updated based on the sensor locations.

18. The system of claim 15, wherein the ambient light baseline is updated, in response to the updated second light intensity varying from the ambient light baseline by a second threshold value.

19. The system of claim 15, wherein for transforming the first flight light intensity, use a first weighting factor for a first set of light sensors located near a foot area of each seat, a second weighting factor for a set of light sensors installed at wall locations within the aircraft cabin, and a third weighting factor for a set of light sensors located at seat back head area of the passenger seats within the aircraft cabin.

20. The system of claim 19, wherein the first weighting factor is smaller than the second and the third weighting factor.

* * * * *